United States Patent [19]
Maeda

[11] 4,264,139
[45] Apr. 28, 1981

[54] LENS SYSTEM FOR FACSIMILE

[75] Inventor: Haruo Maeda, Hino, Japan

[73] Assignee: Olympus Optical Co., Ltd., Tokyo, Japan

[21] Appl. No.: 81,904

[22] Filed: Oct. 4, 1979

Related U.S. Application Data

[63] Continuation-in-part of Ser. No. 943,664, Sep. 18, 1978, abandoned.

[30] Foreign Application Priority Data

Sep. 24, 1977 [JP] Japan .................. 52-115009

[51] Int. Cl.³ .................................................. G02B 9/20
[52] U.S. Cl. ........................................................ 350/476
[58] Field of Search ........................................... 350/227

[56] References Cited

U.S. PATENT DOCUMENTS

| | | | |
|---|---|---|---|
| 2,838,978 | 6/1958 | Mukai | 350/227 |
| 3,876,292 | 4/1975 | Velesik | 350/227 |

FOREIGN PATENT DOCUMENTS

1088248  9/1960  Fed. Rep. of Germany ........... 350/227

*Primary Examiner*—Paul A. Sacher
*Attorney, Agent, or Firm*—Cushman, Darby & Cushman

[57] ABSTRACT

A lens system for facsimile comprising a first positive lens component, a second biconcave lens component and a third lens component consisting of a negative lens element and a positive lens element, said lens system having high OTF and assuring very low distortion as well as high intensity for marginal rays.

4 Claims, 6 Drawing Figures

LENS SYSTEM FOR FACSIMILE

This is a continuation-in-part of my copending application Ser. No. 943,664, filed Sept. 18, 1978, abandoned upon the filing hereof.

BACKGROUND OF THE INVENTION (a) Field of the Invention

The present invention relates to a lens system for facsimile and, more specifically, to a lens system which has performance required for facsimile and can be manufactured at low cost.

(b) Description of the Prior Art

It is required for lens systems for facsimile to have high OTF in combination with an aperture efficiency of 100%. Speaking more concretely, lens systems for facsimile must generally have OTF of 40 lines/mm for both paraxial and offaxial rays, especially OTF for offaxial rays being important. In order to assure an aperture efficiency of 100%, lens systems for facsimile must further have large diameters for favorably correcting coma. Furthermore, it is preferable to maintain spherical aberration a little curved toward the negative side at the maximum numerical aperture in order to match best focused plane as precisely as possible between paraxial and offaxial rays. On the other hand, it can be considered to design such lens systems as of the Tesser type for making them manufacturable at low cost. Though Tesser type lens systems have heretofore been developed in large numbers as photographic camera lens systems, there are available no lens systems which have large film sizes and high OTF. Further, lens systems designed for photographing object at infinite distance cannot be used as lens systems for facsimile since lens systems for facsimile are used for photographing objects at finite distances. Furthermore, lens systems for facsimile are used with a flat plate placed in front of the material to be photographed or light receiving surface and said plate produces astigmatism. From this viewpoint also, general Tesser type lens systems cannot assure high OTF. In addition, lens systems for facsimile must have an aperture efficiency of 100% and are different, in this point, from general lens systems for photographic cameras.

SUMMARY OF THE INVENTION

A general object of the present invention is to provide a lens system for facsimile which is of the Tesser type manufacturable at low cost and can assure high OTF, and in which distortion is controlled to a very low level and marginal rays have high intensities. The lens system for facsimile according to the present invention is of the Tesser type comprising a first positive lens component, a second biconcave lens component and a third cemented doublet component consisting of a negative lens element and a positive lens element, and said lens system being characterized in that it satisfies the conditions enumerated below:

(1) $0.065f \leq d_1 \leq 0.15f$
(2) $0.035f \leq d_2 \leq 0.15f$
(3) $0.015f \leq d_2 - d_3 \leq 0.12f$
(4) $0.13f \leq d_4 + d_5 + d_6 \leq 0.24f$
(5) $0.28f \leq |f_2| \leq 0.41f$
(6) $0.26f \leq r_1 \leq 0.55f$
(7) $0.9 \leq r_1/r_4 \leq 1.5$ wherein the reference symbols represent as follows:

$d_1, d_2, d_3, d_4, d_5, d_6$: thicknesses of the respective lens elements and airspaces therebetween $r_1, r_4$: radii of curvature of the object side surface of the first lens component and the image side surface of the second lens component $f_2$: focal length of the second lens component $f$: focal length of the entire lens system as a whole Now, significance of the above-mentioned conditions will be described consecutively below.

If, in the conditions (1) and (2), $d_1$ or $d_2$ is smaller than the lower limit, spherical aberration will be overcorrected. If $d_1$ or $d_2$ exceeds the upper limit, in contrast, spherical aberration will be undercorrected.

If $d_2 - d_3$ is smaller than the lower limit of 0.015f defined by the condition (3), flare due to offaxial coma will be aggravated. If $d_2 - d_3$ is larger than the upper limit of the condition (3), meridional image surface will be curved toward the negative side, thereby remarkably degrading performance for offaxial rays.

If $d_4 + d_5 + d_6$ is larger than the upper limit of 0.24f defined by the condition (4), total length of the lens system will be prolonged, thereby making it disadvantageous for obtaining sufficient intensity of marginal rays and, in addition, negative strong distortion will be produced. If $d_4 + d_5 + d_6$ is smaller than the lower limit of 0.13f, in contrast, meridional image surface will be curved toward the negative side, thereby degrading performance for offaxial rays.

If $|f_2|$ is smaller than the lower limit of 0.28f defined by the condition (5), flare due to offaxial coma will be aggravated. If $|f_2|$ exceeds the upper limit of 0.41f, it will be difficult to correct Petzval's sum of the entire lens system.

If $r_1$ is smaller than the lower limit of 0.26f defined by the condition (6), spherical aberration will be undercorrected. If $r_1$ is larger than the upper limit of 0.55f, spherical aberration will be overcorrected and, in addition, negative distortion will be produced.

If $r_1/r_4$ is smaller than the lower limit of 0.9 defined by the condition (7), spherical aberration will be undercorrected. If $r_1/r_4$ exceeds the upper limit of 1.5, in contrast, spherical aberration will be overcorrected and, in addition, negative strong distortion will be produced, thereby degrading performance as a lens system for facsimile.

DETAILED DESCRIPTION OF THE PREFERRED EMBODIMENTS

Now, some preferred embodiments of the lens system for facsimile according to the present invention will be described detailedly with reference to the accompanying drawings.

Embodiment 1

$r_1 = 0.3169$
$r_2 = -11.8835$
$d_1 = 0.0779 \quad n_1 = 1.64852 \quad \nu_1 = 53.2$

Embodiment 1 (continued)

| | | | |
|---|---|---|---|
| $r_3 = -0.7002$ | $d_2 = 0.0432$ | | |
| | $d_3 = 0.0188$ | $n_2 = 1.59270$ | $\nu_2 = 35.29$ |
| $r_4 = 0.2825$ | | | |
| | $d_4 = 0.0671$ | | |
| $r_5 = -2.4987$ | | | |
| | $d_5 = 0.0228$ | $n_3 = 1.53172$ | $\nu_3 = 48.9$ |
| $r_6 = 0.3458$ | | | |
| | $d_6 = 0.0819$ | $n_4 = 1.65844$ | $\nu_4 = 50.9$ |
| $r_7 = -0.4796$ | | | |
| | $d_7 = 1.0118$ | | |
| $r_8 = \infty$ | | | |
| | $d_8 = 0.0280$ | $n_5 = 1.52249$ | $\nu_5 = 59.79$ |
| $r_9 = \infty$ | | | |
| $f = 1.0$ | | $F/5.0$ | $\beta = -0.203$ |
| $f_2 = -0.3373$ | | | |

Embodiment 2

| | | | |
|---|---|---|---|
| $r_0 = \infty$ | | | |
| | $d_0 = 0.5337$ | $n_0 = 1.51633$ | $\nu_0 = 64.15$ |
| $r'_0 = \infty$ | | | |
| | $d'_0 = 9.8955$ | | |
| $r_1 = 0.5134$ | | | |
| | $d_1 = 0.1252$ | $n_1 = 1.64852$ | $\nu_1 = 53.2$ |
| $r_2 = \infty$ | | | |
| | $d_2 = 0.1247$ | | |
| $r_3 = -0.5046$ | | | |
| | $d_3 = 0.0252$ | $n_2 = 1.59270$ | $\nu_2 = 35.29$ |
| $r_4 = 0.3731$ | | | |
| | $d_4 = 0.0883$ | | |
| $r_5 = 2.4257$ | | | |
| | $d_5 = 0.0247$ | $n_3 = 1.53172$ | $\nu_3 = 48.9$ |
| $r_6 = 0.4821$ | | | |
| | $d_6 = 0.1033$ | $n_4 = 1.69350$ | $\nu_4 = 53.23$ |
| $r_7 = -0.4360$ | | | |
| | $d_7 = 0.9287$ | | |
| $r_8 = \infty$ | | | |
| | $d_8 = 0.0243$ | $n_5 = 1.51633$ | $\nu_5 = 64.15$ |
| $r_9 = \infty$ | | | |
| $f = 1.0$ | | $F/4.0$ | $\beta = -0.104$ |
| $f_2 = -0.3581$ | | | |

Embodiment 3

| | | | |
|---|---|---|---|
| $r_1 = 0.38149$ | | | |
| | $d_1 = 0.1262$ | $n_1 = 1.65160$ | $\nu_1 = 58.67$ |
| $r_2 = \infty$ | | | |
| | $d_2 = 0.0675$ | | |
| $r_3 = -0.66341$ | | | |
| | $d_3 = 0.0279$ | $n_2 = 1.59270$ | $\nu_2 = 35.29$ |
| $r_4 = 0.31361$ | | | |
| | $d_4 = 0.0675$ | | |
| $r_5 = \infty$ | | | |
| | $d_5 = 0.0279$ | $n_3 = 1.53172$ | $\nu_3 = 48.90$ |
| $r_6 = 0.35224$ | | | |
| | $d_6 = 0.1076$ | $n_4 = 1.69350$ | $\nu_4 = 53.23$ |
| $r_7 = -0.52935$ | | | |
| | $d_7 = 0.8640$ | | |
| $r_8 = \infty$ | | | |
| | $d_8 = 0.0342$ | $n_5 = 1.51633$ | $\nu_5 = 64.15$ |
| $r_9 = \infty$ | | | |
| $f = 1.0$ | | $F/5.0$ | $\beta = -0.120$ |
| $f_2 = -0.355$ | | | |

Embodiment 4

| | | | |
|---|---|---|---|
| $r_1 = 0.43365$ | | | |
| | $d_1 = 0.1398$ | $n_1 = 1.72916$ | $\nu_1 = 54.68$ |
| $r_2 = -22.28522$ | | | |
| | $d_2 = 0.0524$ | | |
| $r_3 = -0.82723$ | | | |
| | $d_3 = 0.0367$ | $n_2 = 1.62588$ | $\nu_2 = 35.70$ |

Embodiment 4 (continued)

Figure 1:
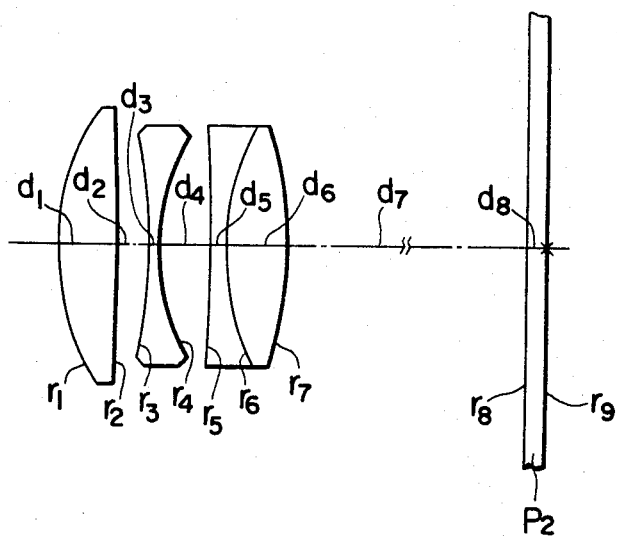
FIG. 1 shows a sectional view illustrating the compositions of the Embodiment 1, Embodiment 3 and Embodiment 4 of the present invention.
Figure 2:
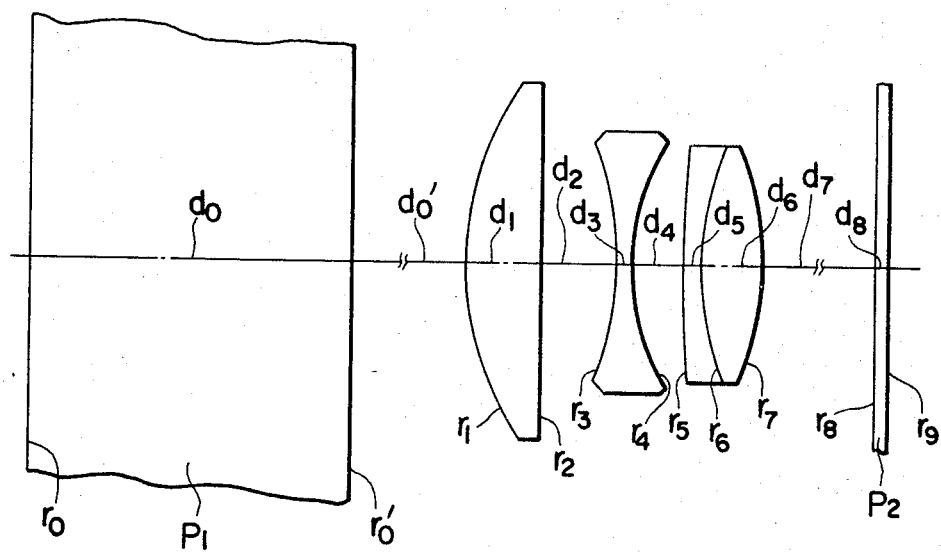
FIG. 2 shows a sectional view illustrating the composition of the Embodiment 2.
Figure 3:
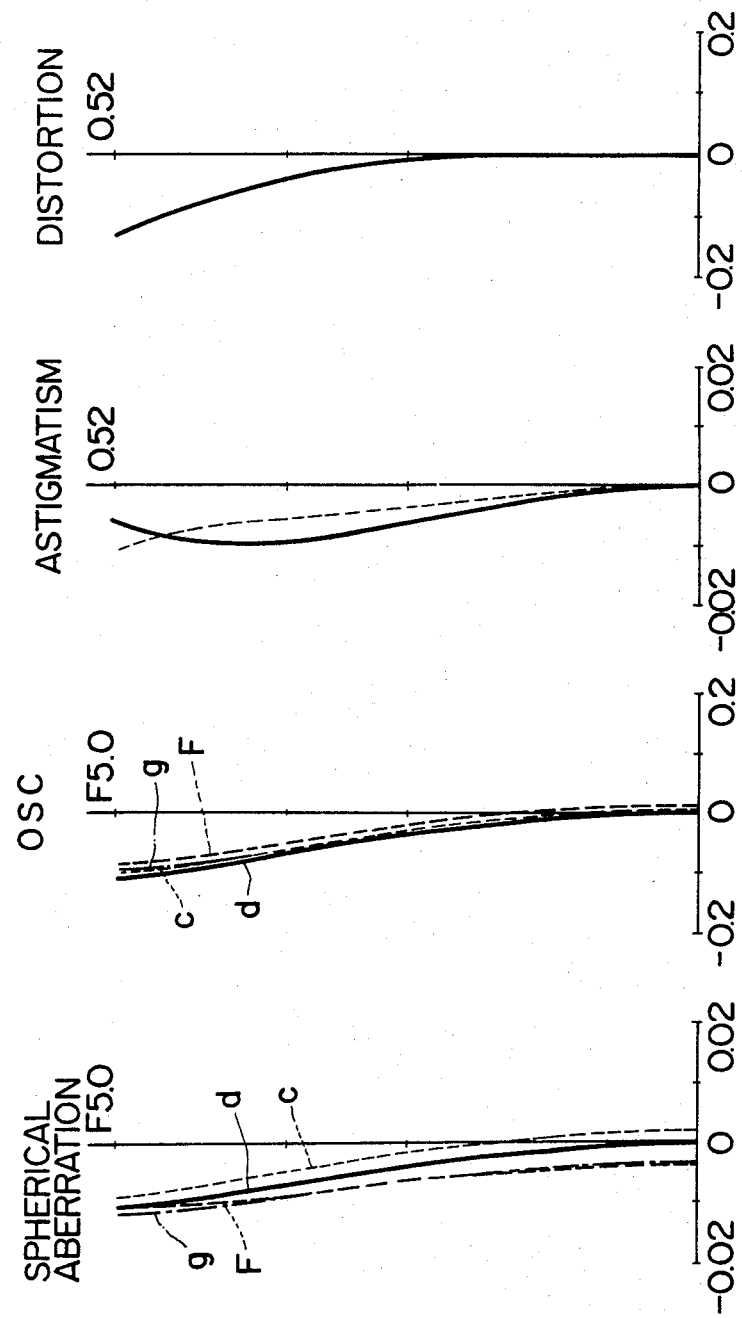
FIG. 3 through FIG. 6 illustrate curves visualizing the aberration characteristics of respective embodiments of the present invention.
Figure 4:
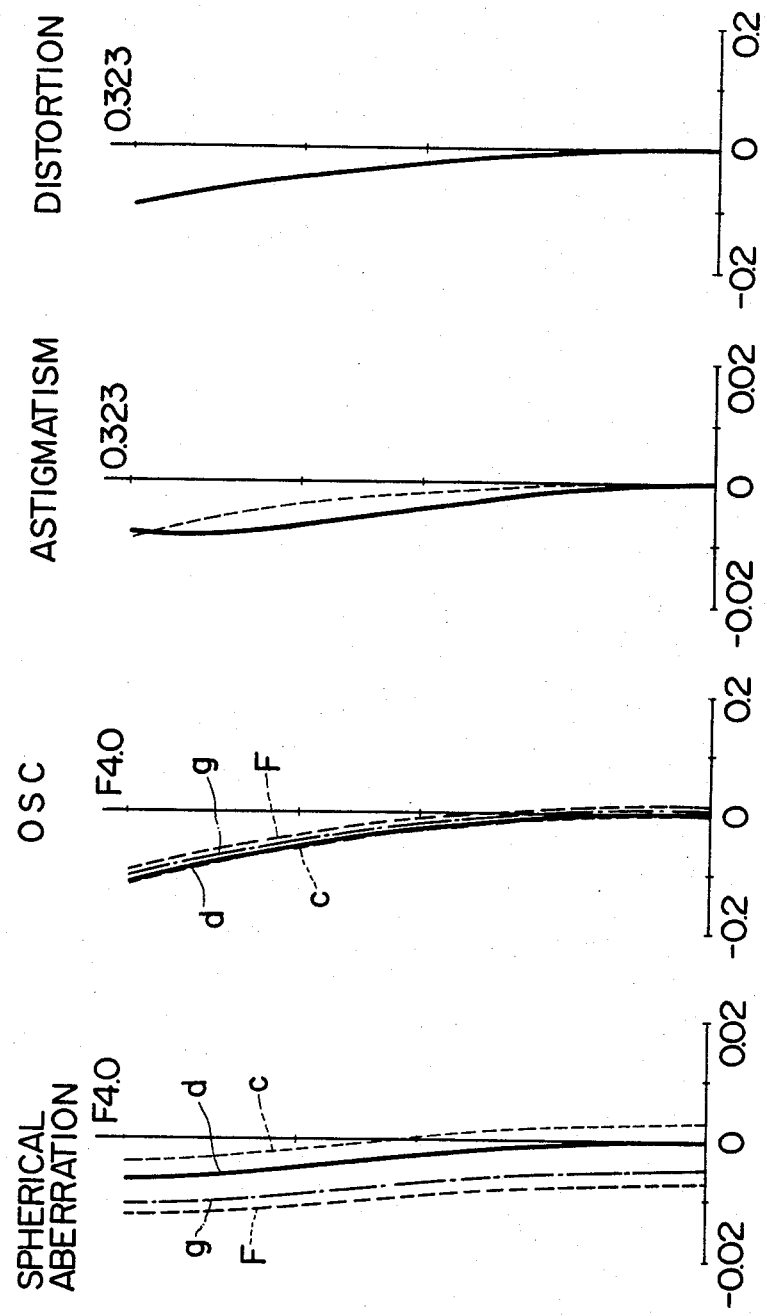
Figure 5:
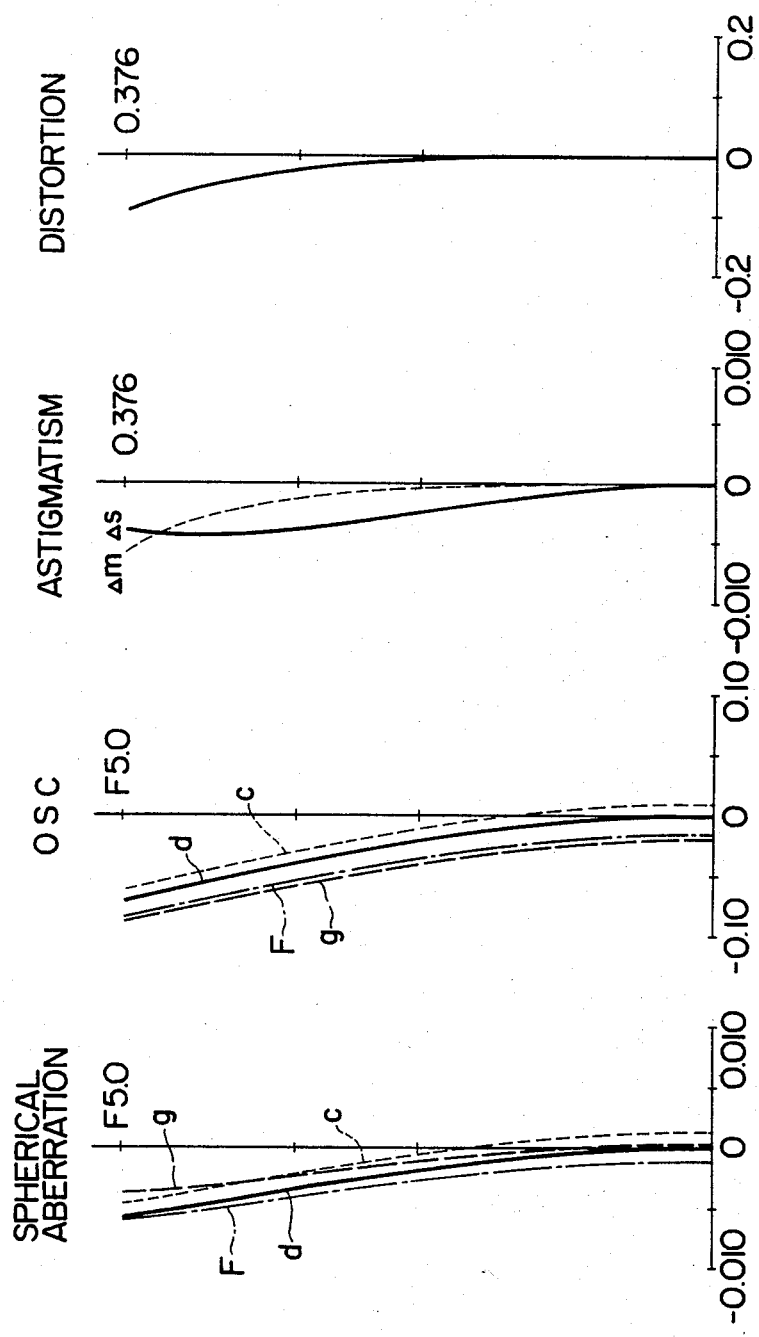
Figure 6:
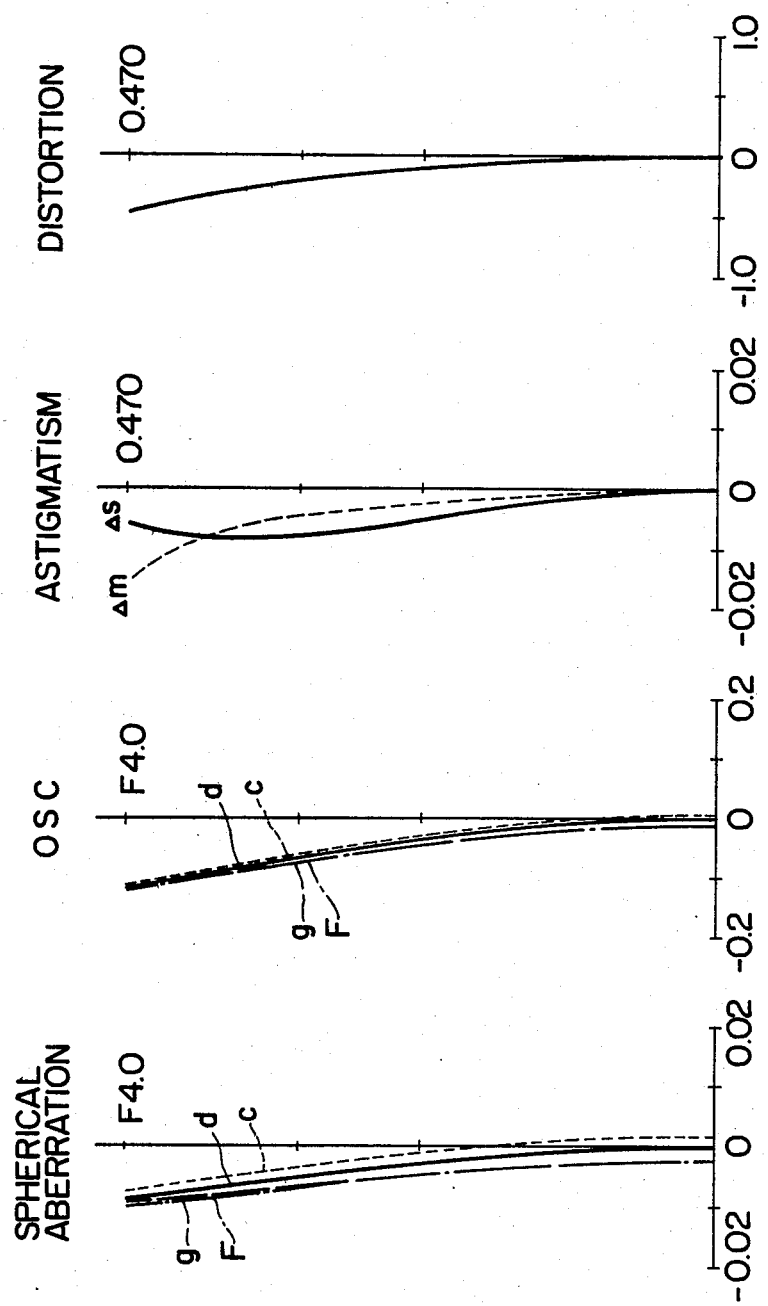

| | | | |
|---|---|---|---|
| $r_4 = 0.35572$ | | | |
| | $d_4 = 0.0743$ | | |
| $r_5 = -241.3313$ | | | |
| | $d_5 = 0.0393$ | $n_3 = 1.53172$ | $\nu_3 = 48.90$ |
| $r_6 = 0.45332$ | | | |
| | $d_6 = 0.1258$ | $n_4 = 1.69680$ | $\nu_4 = 55.52$ |
| $r_7 = -0.57986$ | | | |
| | $d_7 = 0.0500$ | | |
| $r_8 = \infty$ | | | |
| | $d_8 = 0.0437$ | $n_5 = 1.51633$ | $\nu_5 = 64.15$ |
| $r_9 = \infty$ | | | |
| $f = 1.0$ | | $F/4.0$ | $\beta = -0.084$ |
| $f_2 = -0.393$ | | | | wherein the reference symbols $r_1$ through $r_9$ represent radii of curvature on the surfaces of the respective lens elements, the reference symbols $d_1$ through $d_8$ designate thicknesses of the respective lens elements and airspaces therebetween, the reference symbols $n_1$ through $n_5$ denote refractive indices of the respective lens elements and the reference symbols $\nu_1$ through $\nu_5$ represent Abbe's numbers of the respective lens elements. Out of the embodiments described above, the Embodiment 1, Embodiment 3 and Embodiment 4 have such compositions as shown in FIG. 1 wherein the reference symbol $P_2$ represent a cover glass arranged on the surface of a light receiving element. Radii of curvature on both the surfaces of the cover glass, airspace between the final surface of the lens element and the cover glass, thickness of the cover glass, refractive index of the cover glass and Abbe's number of the cover glass are represented by the reference symbols $r_8$, $r_9$, $d_7$, $d_8$, $n_5$ and $\nu_5$ respectively in the Embodiment 1, Embodiment 3 and Embodiment 4. The Embodiment 2 has such a composition as shown in FIG. 2 wherein the reference symbol $P_1$ represents a glass block placed on the surface of a material to be photographed and the reference symbol $P_2$ designates a cover glass arranged on the surface of the light receiving element. Radii of curvature on both the surfaces of the glass block $P_1$, thickness of said glass block, airspace between said glass block and the first surface of the lens element, refractive index of said glass block and Abbe's number of said glass block are designated by the reference symbols $r_0$, $r'_0$, $d_0$, $d'_0$, $n_0$ and $\nu_0$ respectively in the Embodiment 2. Further, the reference symbols used for representing the parameters of the cover glass $P_2$ are also adopted in the Embodiment 2. These embodiments shows excellent aberration characteristics as illustrated in FIG. 3 through FIG. 6 respectively. Though the spherical aberrations for marginal rays are slightly curved toward the negative side in these figures, it is necessary for matching best focused plane between paraxial and offaxial rays.

I claim:

1. A lens system for facsimile comprising a first positive lens component, a second biconcave lens component and a third cemented doublet component consisting of a negative lens element and a positive lens element, and said lens system having the following numerical data:

| | | | |
|---|---|---|---|
| $r_1 = 0.3169$ | | | |
| | $d_1 = 0.0779$ | $n_1 = 1.64852$ | $\nu_1 = 53.2$ |
| $r_2 = -11.8835$ | | | |
| | $d_2 = 0.0432$ | | |
| $r_3 = -0.7002$ | | | |
| | $d_3 = 0.0188$ | $n_2 = 1.59270$ | $\nu_2 = 35.29$ |

-continued

| | | | |
|---|---|---|---|
| $r_4 = 0.2825$ | | | |
| | $d_4 = 0.0671$ | | |
| $r_5 = -2.4987$ | | | |
| | $d_5 = 0.0228$ | $n_3 = 1.53172$ | $\nu_3 = 48.9$ |
| $r_6 = 0.3458$ | | | |
| | $d_6 = 0.0819$ | $n_4 = 1.65844$ | $\nu_4 = 50.9$ |
| $r_7 = -0.4796$ | | | |
| | $f = 1.0$ | $F/5.0$ | $\beta = -0.203$ |
| | $f_2 = -0.3373$ | | | wherein the reference symbols $r_1$ through $r_7$ represent radii of curvature on the surfaces of the respective lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

2. A lens system for facsimile comprising a first positive lens component, a second biconcave lens component and a third cemented doublet component consisting of a negative lens element and a positive lens element, and said lens system having the following numerical data:

| | | | |
|---|---|---|---|
| $r_1 = 0.5134$ | | | |
| | $d_1 = 0.1252$ | $n_1 = 1.64852$ | $\nu_1 = 53.2$ |
| $r_2 = \infty$ | | | |
| | $d_2 = 0.1247$ | | |
| $r_3 = -0.5046$ | | | |
| | $d_3 = 0.0252$ | $n_2 = 1.59270$ | $\nu_2 = 35.29$ |
| $r_4 = 0.3731$ | | | |
| | $d_4 = 0.0883$ | | |
| $r_5 = 2.4257$ | | | |
| | $d_5 = 0.0247$ | $n_3 = 1.53172$ | $\nu_3 = 48.9$ |
| $r_6 = 0.4821$ | | | |
| | $d_6 = 0.1033$ | $n_4 = 1.69350$ | $\nu_4 = 53.23$ |
| $r_7 = -0.4360$ | | | |
| | $f = 1.0$ | $F/4.0$ | $\beta = -0.104$ |
| | $f_2 = -0.3581$ | | | wherein the reference symbols $r_1$ through $r_7$ represent radii of curvature on the surfaces of the respective lens elements, the reference symbols $d_1$ through $d_6$ designates thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

3. A lens system for facsimile comprising a first positive lens component, a second biconcave lens component and a third cemented doublet component consisting of a negative lens element and a positive lens element, and said lens system having the following numerical data:

| | | | |
|---|---|---|---|
| $r_1 = 0.38149$ | | | |
| | $d_1 = 0.1262$ | $n_1 = 1.65160$ | $\nu_1 = 58.67$ |
| $r_2 = \infty$ | | | |
| | $d_2 = 0.0675$ | | |
| $r_3 = -0.66341$ | | | |
| | $d_3 = 0.0279$ | $n_2 = 1.59270$ | $\nu_2 = 35.29$ |
| $r_4 = 0.31361$ | | | |
| | $d_4 = 0.0675$ | | |
| $r_5 = \infty$ | | | |
| | $d_5 = 0.0279$ | $n_3 = 1.53172$ | $\nu_3 = 48.90$ |
| $r_6 = 0.35224$ | | | |
| | $d_6 = 0.1076$ | $n_4 = 1.69350$ | $\nu_4 = 53.23$ |
| $r_7 = -0.52935$ | | | |
| | $f = 1.0$ | $F/5.0$ | $\beta = -0.120$ |
| | $f_2 = -0.355$ | | | wherein the reference symbols $r_1$ through $r_7$ represent radii of curvature on the surfaces of the respective lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

4. A lens system for facsimile comprising a first positive lens component, a second biconcave lens component and a third cemented doublet component consisting of a negative lens element and a positive lens element, and said lens system having the following numerical data:

| | | | |
|---|---|---|---|
| $r_1 = 0.43365$ | | | |
| | $d_1 = 0.1398$ | $n_1 = 1.72916$ | $\nu_1 = 54.68$ |
| $r_2 = -22.28522$ | | | |
| | $d_2 = 0.524$ | | |
| $r_3 = -0.82723$ | | | |
| | $d_3 = 0.0367$ | $n_2 = 1.62588$ | $\nu_2 = 35.70$ |
| $r_4 = 0.35572$ | | | |
| | $d_4 = 0.0743$ | | |
| $r_5 = -241.3313$ | | | |
| | $d_5 = 0.0393$ | $n_3 = 1.53172$ | $\nu_3 = 48.90$ |
| $r_6 = 0.45332$ | | | |
| | $d_6 = 0.1258$ | $n_4 = 1.69680$ | $\nu_4 = 55.52$ |
| $r_7 = -0.57986$ | | | |
| | $f = 1.0$ | $F/4.0$ | $\beta = -0.084$ |
| | $f_2 = 0.393$ | | | wherein the reference symbols $r_1$ through $r_7$ represent radii of curvature on the surfaces of the respective lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

* * * * *